United States Patent
Mullen, Jr.

(10) Patent No.: US 6,300,569 B1
(45) Date of Patent: Oct. 9, 2001

(54) 90° SEALING NUT (75) Inventor: Thomas M. Mullen, Jr., Dunellen, NJ (US)

(73) Assignee: Heyco Products, Inc., Toms River, NJ (US)

(*) Notice: Subject to any disclaimer, the term of this patent is extended or adjusted under 35 U.S.C. 154(b) by 0 days.

(21) Appl. No.: 09/367,324

(22) PCT Filed: Feb. 12, 1998

(86) PCT No.: PCT/US98/02692

§ 371 Date: Aug. 11, 1999

§ 102(e) Date: Aug. 11, 1999

(87) PCT Pub. No.: WO98/36481

PCT Pub. Date: Aug. 20, 1998

Related U.S. Application Data (60) Provisional application No. 60/038,371, filed on Feb. 13, 1997.

(51) Int. Cl.⁷ .................................................. H01G 3/18
(52) U.S. Cl. .................. 174/65 R; 248/74.1; 285/92; 439/466
(58) Field of Search ................. 174/65 R, 65 SS, 174/65 G, 152 G, 135, 93; 285/92, 161, 139.2, 126.1; 439/466, 467, 473; 248/74.1, 74.2, 56; D13/154, 156; D8/315

(56) References Cited

U.S. PATENT DOCUMENTS

| | | |
|---|---|---|
| 2,664,458 | 12/1953 | Rapata . |
| 2,967,722 | 1/1961 | Lifka . |
| 3,809,798 | 5/1974 | Simon . |
| 4,224,464 | 9/1980 | Bunnell et al. . |
| 4,302,035 * | 11/1981 | Ochwat ........................... 174/65 R |
| 4,371,172 * | 2/1983 | de Vienne ....................... 174/65 SS |
| 4,487,386 | 12/1984 | Hehl . |
| 4,490,576 | 12/1984 | Bolante et al. . |
| 4,494,779 * | 1/1985 | Neff et al. ....................... 174/65 R |
| 4,692,562 | 9/1987 | Nattel . |
| 4,698,456 | 10/1987 | Drake . |
| 4,739,126 | 4/1988 | Gutter et al. . |
| 4,874,325 | 10/1989 | Bensing et al. . |
| 4,888,453 | 12/1989 | Blasko . |
| 5,072,072 | 12/1991 | Bawa et al. . |
| 5,098,310 | 3/1992 | Avramovich et al. . |

(List continued on next page.)

FOREIGN PATENT DOCUMENTS

| | | |
|---|---|---|
| 0151272 | 12/1984 | (EP) . |
| 0151273 | 12/1984 | (EP) . |
| 0283575 | 12/1987 | (EP) . |
| 2219146 | 11/1989 | (GB) . |
| 2258350 | 3/1993 | (GB) . |
| 9836481 | 8/1998 | (WO) . |

*Primary Examiner*—Kristine Kincaid
*Assistant Examiner*—Dhiru R Patel
(74) *Attorney, Agent, or Firm*—Selitto & Associates (57) ABSTRACT

A fitting for retaining an electric cord having a generally cylindrical conduit body with a central bore is threaded at first and second ends thereof. The first end of the body has a plurality of fingers extending in an axial direction therefrom, each of the fingers being spaced from adjacent fingers and terminating at a free end thereof in a wedge-shaped gripper extending normal to the axial direction. A flexible, generally cylindrical gland is disposed within a mating recess formed in the central bore of the body. The recess has a lower annular seat formed about the periphery of the central bore proximate the origin of the fingers, the lower annular seat tapering toward the second end as the seat extends radially outward. The recess is further defined by an upper annular seat formed on an inside surface of each of the wedge-shaped grippers. A sealing nut, which is threadedly received on the first end of the body, urges the wedge-shaped grippers radially inwards and downwards toward the second end as it is tightened, thereby pressing the gland against the cord.

16 Claims, 12 Drawing Sheets

U.S. PATENT DOCUMENTS

| | | | |
|---|---|---|---|
| 5,132,493 | * | 7/1992 | Sheehan .............................. 174/65 R |
| 5,200,575 | | 4/1993 | Sheehan . |
| 5,208,427 | * | 5/1993 | Couto et al. ...................... 174/65 R |
| 5,226,837 | | 7/1993 | Cinibulk et al. . |
| 5,304,742 | | 4/1994 | Filbert . |
| 5,318,459 | | 6/1994 | Shields . |
| 5,321,205 | | 6/1994 | Bawa et al. . |
| 5,405,172 | | 4/1995 | Mullen, Jr. . |
| 5,540,450 | * | 7/1996 | Hayashi et al. .................. 174/152 G |
| 5,563,378 | | 10/1996 | Uchida et al. . |
| 5,800,201 | * | 9/1998 | Takata et al. ....................... 439/466 |
| 5,872,335 | | 2/1999 | Mullen, Jr. . |
| 5,984,373 | * | 11/1999 | Fitoussi et al. ........................ 285/92 |

\* cited by examiner

90° SEALING NUT

This application claims benefit of provisional application No. 60/038,371, filed Feb. 13, 1997. This application is a 371 of PCT/US98/02692, filed Feb. 12, 1998.

TECHNICAL FIELD OF THE INVENTION

The present invention relates to a liquid-tight fitting, and, more particularly, to a liquid-tight fitting equipped with a 90° sealing nut, locking means and a cup-shaped flange.

BACKGROUND ART

In the past, various devices have been developed for feeding a wire, cable, tube or the like to an electrical and/or mechanical device at an angle such as 90° (see, for instance, European Patent No. 0 283 575 B1, European Patent No. 0 151 273 B1 and the HSK strain relief snap elbow marketed by Hummel GmbH). Some of these devices are equipped with bases and covers pivotally connected to the bases for orienting associated cables at an angle, as well as clamping mechanisms for providing sealing and/or strain relief. However, it is believed that if the covers of such devices are accidentally opened during use, the sealing and/or strain relief functions provided by the clamping mechanisms are compromised. Accordingly, there is a need for a device which is adapted to maintain the integrity of the sealing and/or strain relief functions provided thereby, even if its cover is accidentally or otherwise opened during use.

DISCLOSURE OF THE INVENTION

The present invention overcomes the disadvantages and shortcomings of the prior art discussed above by providing a new and improved sealing nut adapted for use in connection with a liquid-tight connector which is mountable on a housing of an electrical or mechanical device and which includes a grasping portion adjacent an end thereof projecting outwardly from the housing. More particularly, the sealing nut includes a base having a passageway extending therethrough along a longitudinal axis of the base and being sized and shaped so as to removably receive the grasping portion of the connector. The sealing nut also includes a cover pivotally connected to the base such that the cover is movable between an open position, in which the cover exposes the passageway of the base to an extent sufficient to allow a cable to be fed through the sealing nut in a substantially straight line running generally parallel to the longitudinal axis of the base, and a closed position, in which the cover overlies the passageway in the base such that the cover loosely guides the cable to form a bend therein. A retaining mechanism is provided for retaining the cover in its closed position. A cooperating mechanism is also provided for cooperating with the grasping portion of the connector so as to grasp an adjacent portion of the cable in a liquid-tight and strain-relieving manner. The cooperating mechanism is located within the base, whereby the liquid-tight and strain-relieving functions performed thereby are not compromised during use even if the cover is inadvertently moved from its closed position.

BRIEF DESCRIPTION OF THE DRAWINGS

For a more complete understanding of the present invention, reference is made to the following detailed description of various exemplary embodiments considered in conjunction with the accompanying drawings, in which.

BEST MODE FOR CARRYING OUT THE INVENTION

Figure 1:
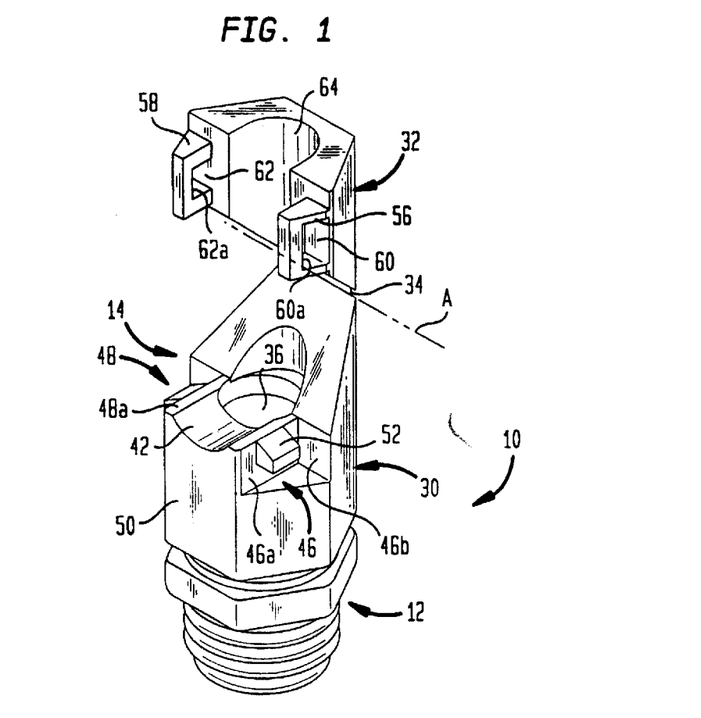
FIG. 1 is a perspective view of a liquid-tight fitting which is equipped with a 90° sealing nut constructed in accordance with a first embodiment of the present invention, the sealing nut being shown in its open position.
Figure 2:
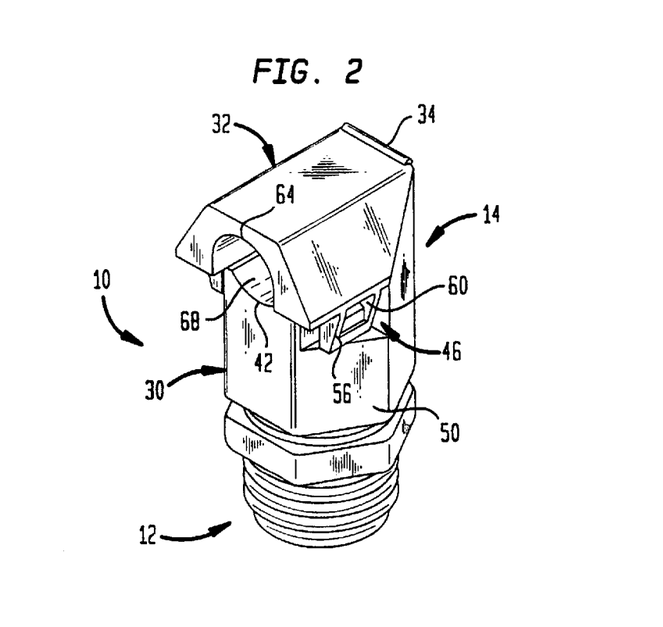
FIG. 2 is a view similar to FIG. 1, except that the sealing nut is in its closed position.
Figure 3:
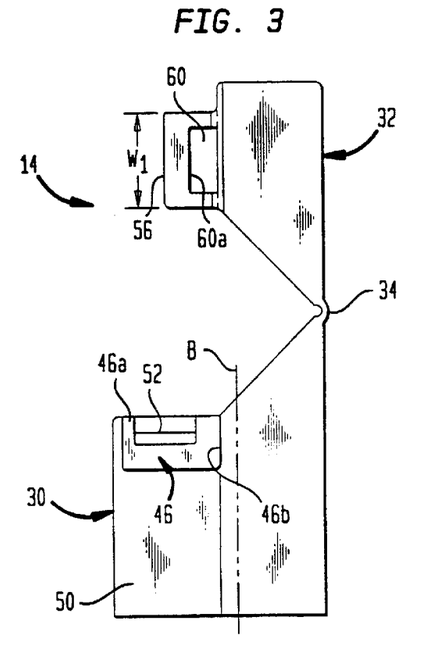
FIG. 3 is a side elevational view of the sealing nut illustrated in FIG. 1.
Figure 4:
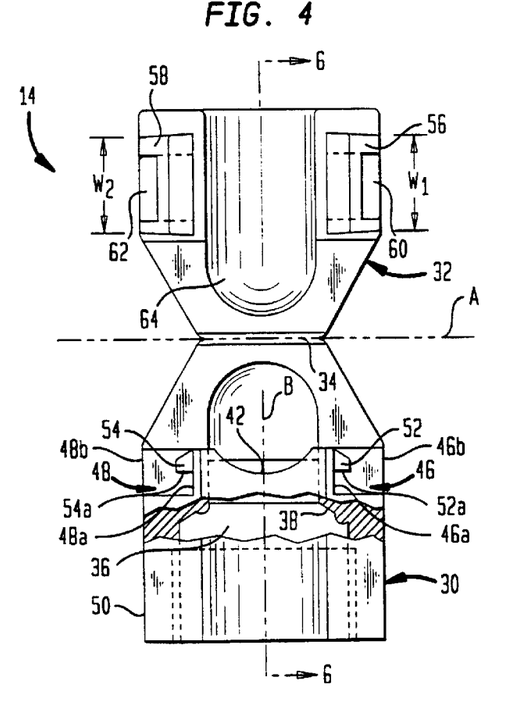
FIG. 4 is a partially cutaway, front elevational view of the sealing nut illustrated in FIGS. 1 and 3.
Figure 5:
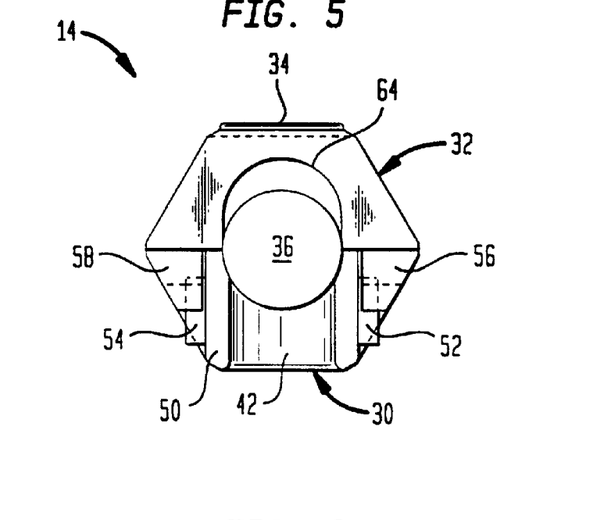
FIG. 5 is a top plan view of the sealing nut illustrated in FIGS. 1, 3 and 4.
Figure 6:
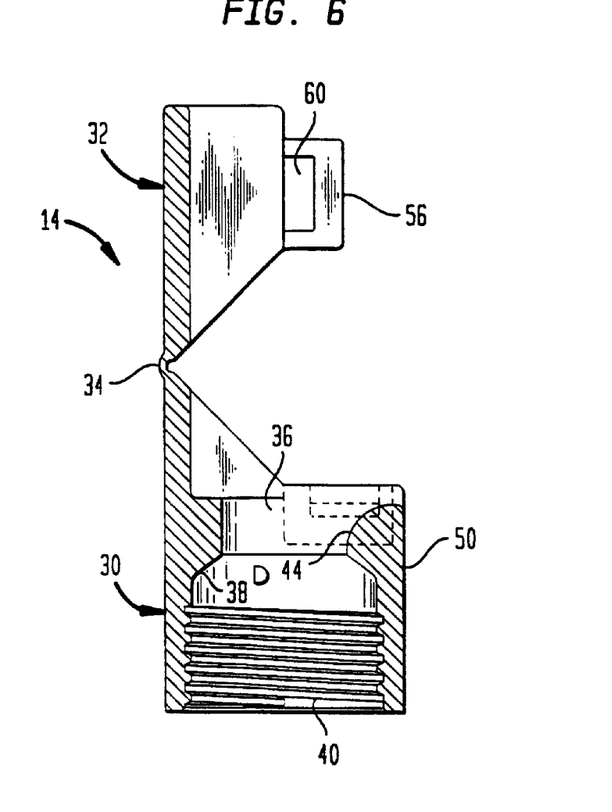
FIG. 6 is a cross-sectional view, taken along section line 6—6 and looking in the direction of the arrows, of the sealing nut illustrated in FIG. 4.
Figure 7:
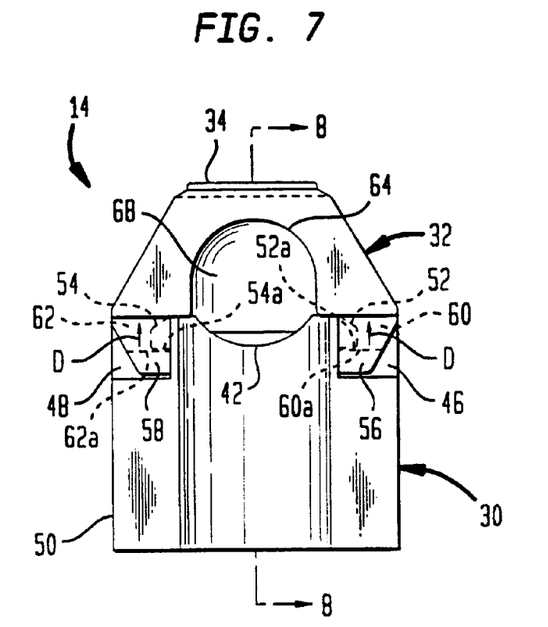
FIG. 7 is a front elevational view of the sealing nut illustrated in FIG. 2.
Figure 8:
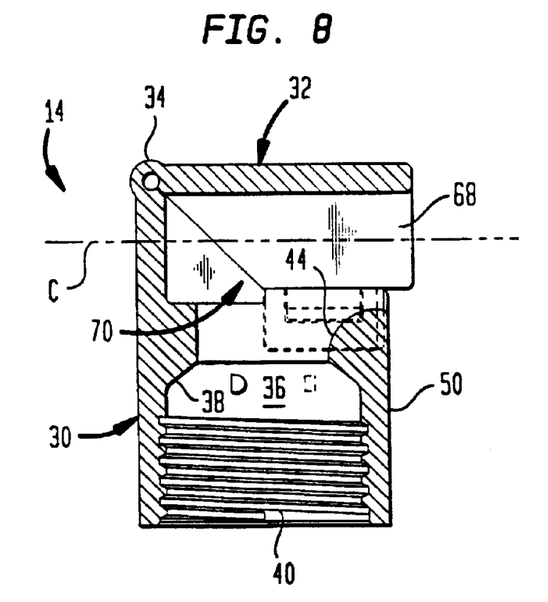
FIG. 8 is a cross-sectional view, taken along section line 8—8 and looking in the direction of the arrows, of the sealing nut illustrated in FIG. 7.

FIG. 1 shows a liquid-tight fitting 10 having a liquid-tight body (i.e., connector) 12 and a 90° sealing nut 14, which is constructed in accordance with a first embodiment of the present invention and which is adapted for use in connection with the body 12. The construction and operation of the body 12 are identical to those of the body of the liquid-tight connector disclosed in U.S. Pat. No. 5,405,172, the specification of which is incorporated herein by reference. For instance, referring to FIG. 9A, the body 12 has an upper portion (i.e., a grasping portion) 16 provided with strain relief fingers 18, a gland 20, which is cradled by the strain relief fingers 18, and threads 22 for coupling the body 12 to the sealing nut 14. The body 12 also has a threaded lower portion 24 for mounting the body 12 on a housing 26 of an electrical and/or mechanical device in a liquid-tight fashion. More particularly, a lock nut 28 is threaded onto the lower portion 24 so as to mount the body 12 on the housing 26. In order to achieve the desired liquid-tight seal between the body 12 and the housing 26, a raised circular ridge 29a is provided on an hexagonal flange 29b of the body 12, the ridge 29a being adapted to come into sealing engagement with the housing 26 when the lock nut 28 is completely threaded onto the lower portion 24 of the body 12. Alternatively, the lower portion 24 can be tapered such that it can be threaded directly into a similarly tapered threaded hole (not shown) formed in the housing 26 of the device, whereby a liquid-tight engagement is formed directly between the lower portion 24 and the hole.

With reference to FIGS. 1–8, the sealing nut 14, which is preferably made from injection grade nylon by an injection molding process, has a base 30, a cover 32 and a living hinge 34, which pivotally connects the cover 32 to the base 30 so as to allow the cover 32 to pivot about a pivot axis A (see FIGS. 1 and 4) and which is integrally formed with the base 30 and the cover 32. The base 30 is adapted to be coupled to the upper portion 16 of the body 12 in a threaded manner and to cooperate with the strain relief fingers 18 and the gland 20 of the body 12 in grasping a cable 33 extending through the liquid-tight fitting 10 in a manner similar to the one described in the '172 Patent (see FIGS. 9B and 9C). In this regard, the base 30 has a longitudinal passageway 36, which extends through the base 30 along a longitudinal axis B thereof (see FIGS. 3 and 4) for feeding the cable 33 therethrough and which is sized and shaped so as to removably receive the upper portion 16 of the body 12, a conical internal surface 38 (see FIG. 4), which is adapted to compress the fingers 18 and the gland 20, and threads 40 (see FIGS. 6 and 8) for coupling the base 30 to the body 12. In addition, the base 30 has an open trough 42 positioned adjacent an upper end of the base 30 and having a smooth arcuate rear surface 44 (see FIGS. 6 and 8) for purposes to be discussed hereinafter. Moreover, the base 30 is equipped with a pair of cavities 46, 48 formed in an exterior wall 50 of the body 12 on opposite sides thereof. The cavities 46, 48 include transverse planar walls 46a, 48a, respectively, which are substantially normal to the pivot axis A, and parallel planar walls 46b, 48b, respectively, which are substantially parallel to the pivot axis A (see FIGS. 1, 3 and 4). Locking tabs 52, 54 are formed and located in the cavities 46, 48, respectively, and extend laterally from the walls 46a, 48a, respectively, of the cavities 46, 48, respectively, of the base 30 in opposite directions. The locking tabs 52, 54 are oriented transversely with respect to the longitudinal axis B of the base 30 for purposes to be discussed hereinafter. That is, the locking tabs 52, 54 include planar locking surfaces 52a, 54a (see FIG. 4), respectively, lying in a plane which is substantially normal to the longitudinal axis B of the base 30. The base 30 also has a hexagonal shape for facilitating the threading of the sealing nut 14 to the body 12 by using a conventional tool such as a wrench (not shown).

Still referring to FIGS. 1–7, the cover 32 is pivotable about the pivot axis A, which extends substantially transverse to the longitudinal axis B of the base 30, between an open position, in which the cover 32 exposes the passageway 36 of the base 30 to an extent sufficient to allow the cable 33 to be fed through the sealing nut 14 in a substantially straight line running generally parallel to the longitudinal axis B of the base 30 (see FIGS. 1, 3–6, 9A and 9B), and a closed position, in which the cover 32 overlies the passageway 36 in the base 30 such that the cover 32 loosely guides the cable 33 to form a bend therein (see FIGS. 2, 7, 8 and 9C). The cover 32 also includes a locking finger 56 depending from one side of the cover 32 and a locking finger 58 depending from an opposite side of the cover 32. Slots 60, 62 are formed in the locking fingers 56, 58, respectively, for coupling the cover 32 to the base 30 in a snap-fit fashion. More particularly, the slots 60, 62 are sized and shaped so as to receive the locking tabs 52, 54, respectively, of the base 30 in a snap-fit fashion when the cover 32 is pivoted towards and pressed against the base 30 (i.e., when the cover 32 is in its closed position). In this regard, the slots 60, 62 include planar locking surfaces 60a, 62a (see FIGS. 1 and 3), respectively, which engage the locking surfaces 52a, 54a, respectively, when the locking tabs 52, 54 engage the locking fingers 56, 58, respectively, thereby maintaining (i.e., retaining) the cover 32 in its closed position (see FIG. 7). In addition, the slots 60, 62 extend completely through interior portions of the locking fingers, 56, 58, respectively, such that the locking fingers 56, 58 surround the locking tabs 52, 54 when the cover 32 is in its closed position (see FIG. 7). Further, when the cover 32 is in its closed position, the slots 60, 62 are so oriented that the locking surfaces 60a, 62a lie in a plane which is substantially normal to the longitudinal axis B of the base 30. The locking fingers 56, 58 also have widths $W_1$, $W_2$ (see FIGS. 3 and 4), respectively, extending in directions which are substantially parallel to the walls 46a, 48a, respectively, of the cavities 46, 48, respectively, when the locking tabs 52, 54 and the locking fingers 56, 58 are engaged (see FIGS. 7 and 8). Moreover, an open trough 64 extends from one end of the cover 32 to an opposite end of the cover 32. The trough 64 is sized and shaped so as to cooperate with the trough 42 of the base 30 to form a lateral passageway 68 communicating with the longitudinal passageway 36 of the base 30 (see FIGS. 2, 7 and 8) and having a longitudinal axis C (see FIG. 8) oriented at a 90° angle relative to the longitudinal axis B of the base 30 when the cover 32 is coupled to the base 30.

Figure 9A:
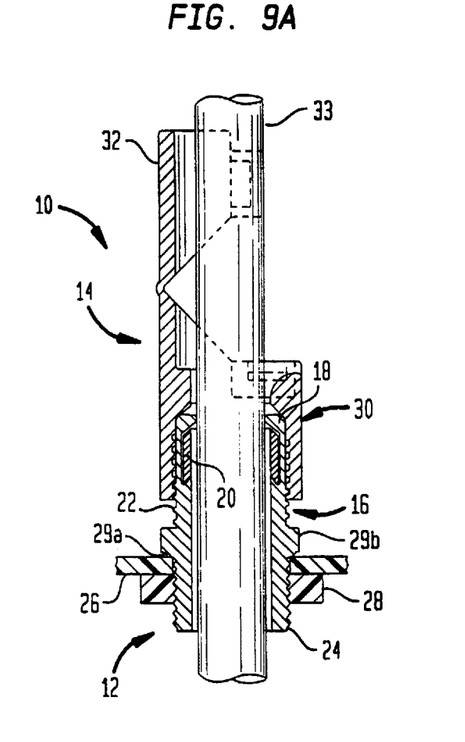
FIGS. 9A–9C are schematic views of the liquid-tight fitting illustrated in FIGS. 1 and 2, showing it in use.
Figure 9B:
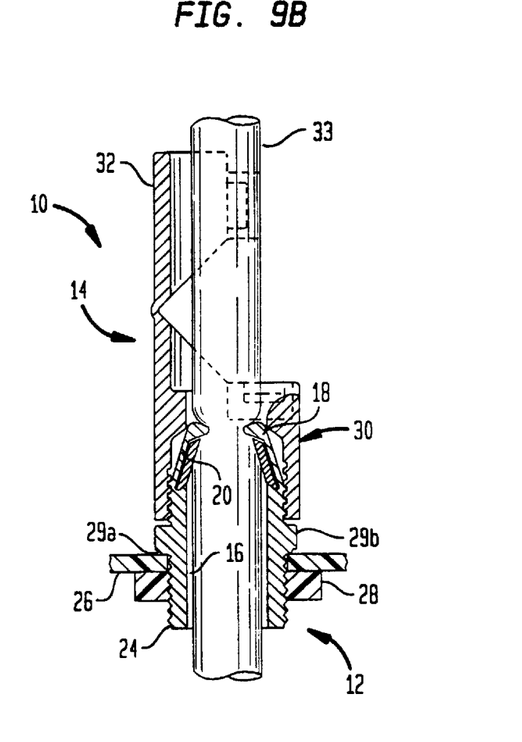
Figure 9C:
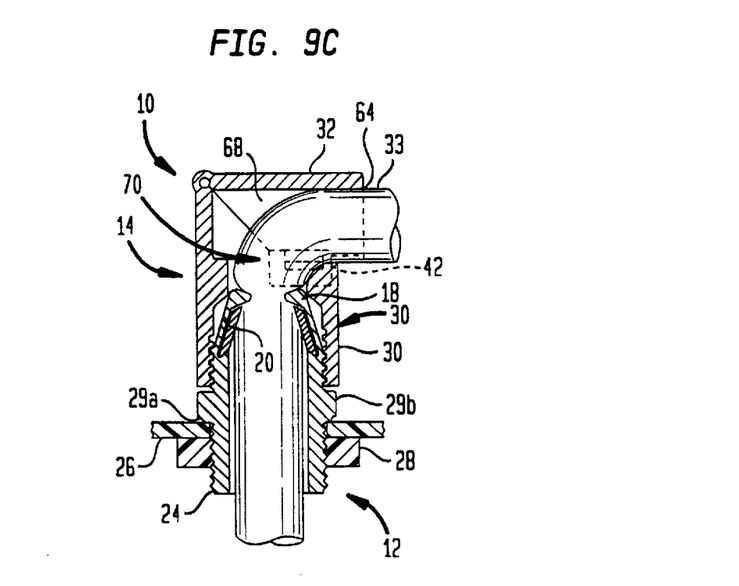
Figure 10:
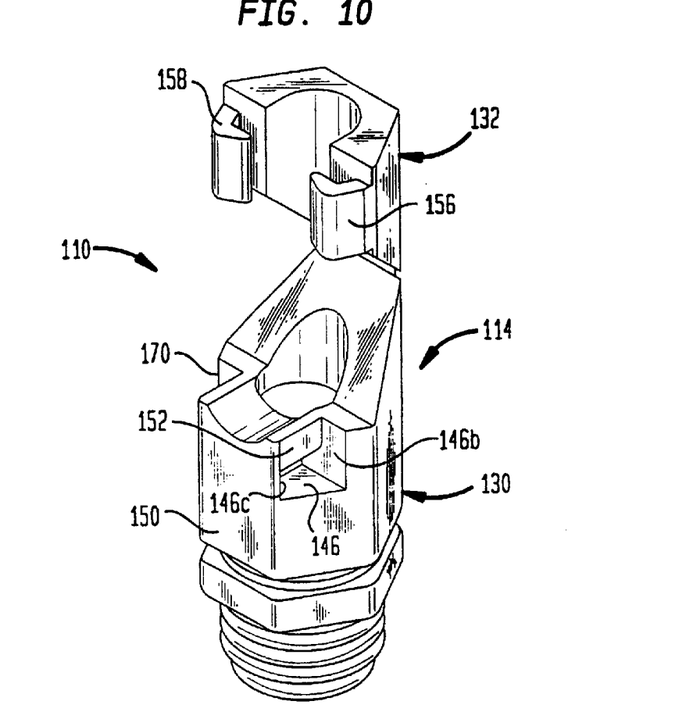
FIG. 10 is a perspective view of a liquid-tight fitting which is equipped with a 90° sealing nut constructed in accordance with a second embodiment of the present invention, the sealing nut being shown in its open position.
Figure 11:
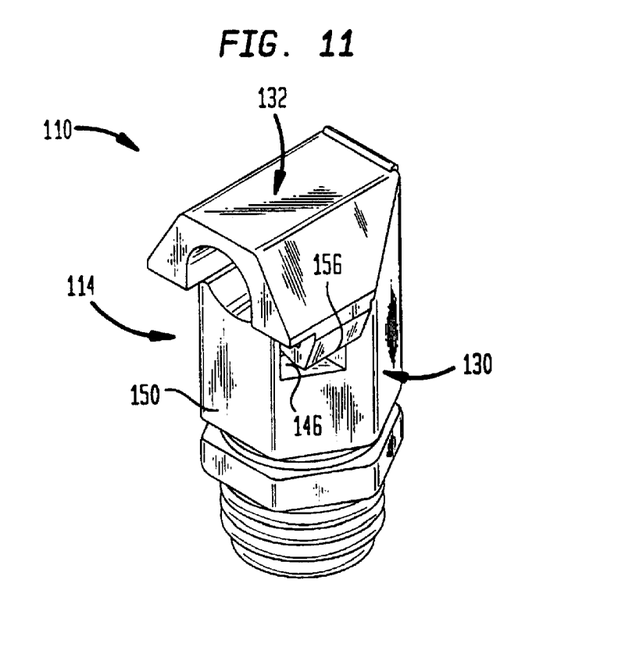
FIG. 11 is a view similar to FIG. 10, except that the sealing nut is in its closed position.
Figure 12:
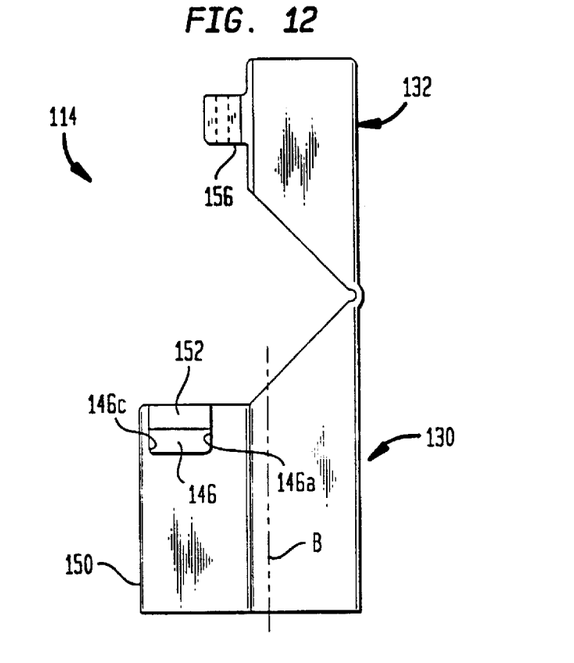
FIG. 12 is a side elevational view of the sealing nut illustrated in FIG. 10.
Figure 13:
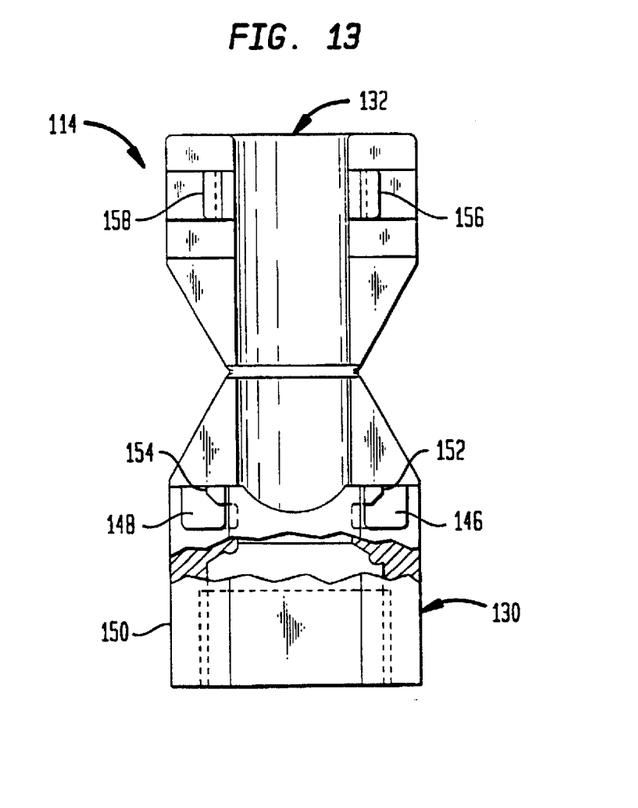
FIG. 13 is a partial cutaway, front elevational view of the sealing nut illustrated in FIGS. 10 and 12.
Figure 14:
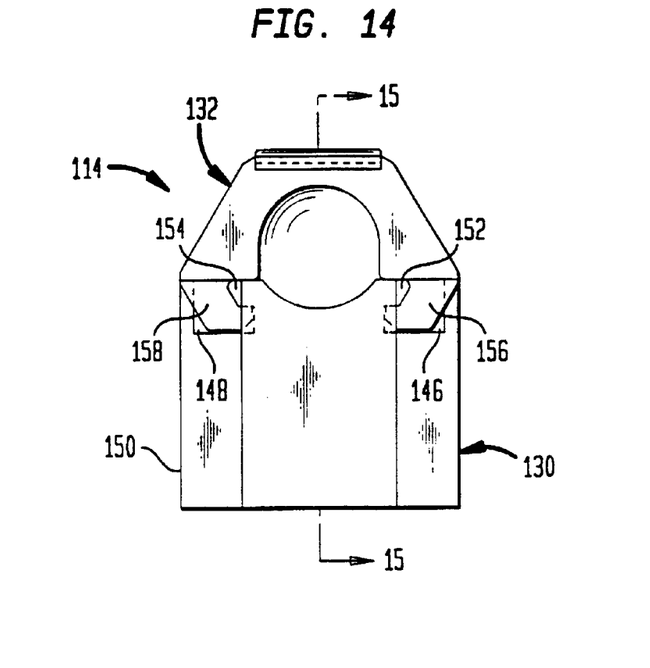
FIG. 14 is a front elevational view of the sealing nut illustrated in FIG. 11.
Figure 15:
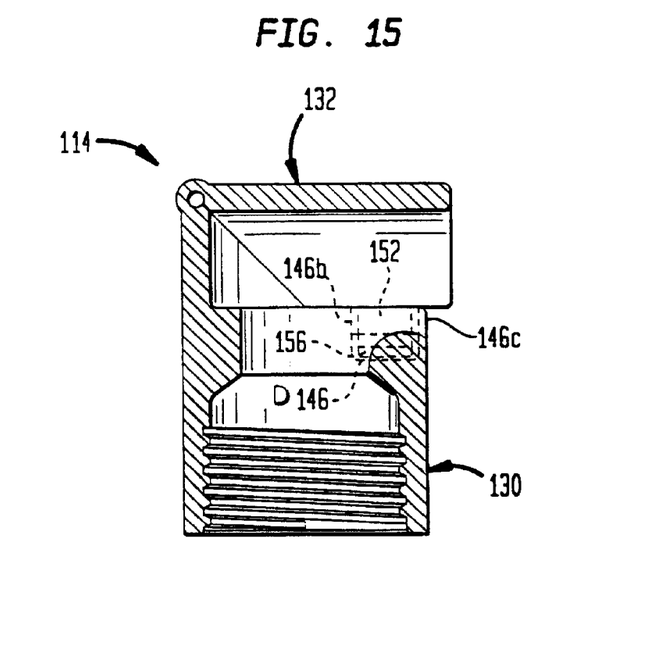
FIG. 15 is a cross-sectional view, taken along section line 15—15 and looking in the direction of the arrows, of the sealing nut illustrated in FIG. 14.

With reference to FIGS. 9A–9C, to use the liquid-tight fitting 10, the body 12 is mounted on the housing 26 of the electrical and/or mechanical device by threading the lock nut 28 to the lower portion 24 of the body 12 or by directly threading the lower portion 24 into a threaded opening formed in the housing 26. With the cover 32 oriented in its open position, the sealing nut 14 is loosely coupled to the upper portion 16 of the body 12 in a threaded manner. The cable 33 is then fed to the device through the longitudinal passageway 36 of the base 30 and the body 12 in a straight line (see FIG. 9A). Alternatively, the body 12, the sealing nut 14 and the cable 33 can be preassembled in the manner described above and then mounted on the housing 26 of the device. Next, the sealing nut 14 is fully threaded to the upper portion 16 of the body 12 such that the base 30 of the sealing nut 14 cooperates with the strain relief fingers 18 and the gland 20 of the body 12 to grasp the cable 33 in a liquid-tight manner (see FIG. 9B), while also providing strain relief. After the liquid-tight fitting 10 is rotated to a position which directs the cable 33 towards its desired destination outside the housing 26, the cover 32 is snap-fitted to the base 30. More particularly, the locking tabs 52, 54 of the base 30 are snap-fitted into the slots 60, 62, respectively, of the locking fingers 56, 58, respectively (see FIGS. 7 and 9C), thereby orienting the cover 32 in its closed position. In the foregoing manner, the cable 33 is captured between the troughs 42, 64 of the base 30 and cover 32, respectively, and is thus positioned in the lateral passageway 68. As a result, the cable 33 is caused to form a 90° bend adjacent a junction 70 (see FIGS. 8 and 9C) formed between the passageway 36 of the base 30 and the lateral passageway 68 and is thereby fed to the electrical and/or mechanical device at a 90° angle.

It should be appreciated that the present invention provides numerous advantages over the prior art. For instance, because the cover 32 pivots away from the base 30 to expose the longitudinal passageway 36, it allows the cable 33 to be fed to the housing 26 through the liquid-tight fitting 10 in a straight line. In this manner, the sealing nut 14 makes the feeding of the cable 33 to the housing 26 both simple and efficient. Moreover, because the cable 33 is grasped by the body 12 at the base 30 in a sealing and strain-relieving manner, even if the cover 32 is accidentally or otherwise opened during the use of the sealing nut 14, the sealing and strain-relieving functions performed by the body 12 and the sealing nut 14 are not compromised. In addition, due to its curved smooth shape, the arcuate surface 44, which is formed adjacent the junction 70, facilitates the bending of the cable 33 thereabout when the cover 32 is moved from its open position to its closed position and functions to minimize damage to the cable 33 (e.g., in the form of cuts caused by sharp edges and the like) during the bending of the cable 33 and/or the usage of the liquid-tight fitting 10.

The locking mechanism of the present invention also provides further advantages over the prior art. For instance, because the locking tabs 52, 54 are oriented transversely relative to the longitudinal axis B of the base 30, the locking tabs 52, 54 and the locking fingers 56, 58 come to engage each other in a vertical direction. That is, the locking surfaces 60a, 62a of the locking fingers 56, 58, respectively, lie in a plane which is normal to the longitudinal axis B of the base 30, when the locking fingers 56, 58 engage the locking tabs 52, 54, respectively. As a result, any reaction force in the locking fingers 56, 58 in response to external forces acting upon the sealing nut 14 tends to be in a direction substantially parallel to the longitudinal axis B (as indicated by vertically directed arrows D in FIG. 7). In such circumstances, the locking fingers 56, 58 and the locking tabs 52, 54 provide enhanced resistance to their disengagement and hence enhanced resistance to accidental disengagement of the cover 32 from the base 30. Further, because the locking fingers 56, 58 completely surround the locking tabs 52, 54, respectively, the locking fingers 56, 58 are inhibited from sliding laterally relative to the locking tabs 52, 54, respectively, when external force is applied to the cover 32, thereby further enhancing resistance to disengagement. Moreover, because the locking fingers 56 58 completely surround the locking tabs 52, 54, the interlocking engagement between the locking fingers 56, 58 and the locking tabs 52, 54, respectively, is maintained, even if the hinge 34 is cracked or otherwise broken during the use of the sealing nut 14. In this manner, the cover 32 is adapted to remain coupled to the base 30 and to thereby maintain the 90° angular orientation of the cable 33 even without the benefit of the structural support normally provided by the hinge 34.

The cover 32 also provides additional advantages over the prior art. For instance, the trough 64 provides the cover 32 with a spring-like characteristic. As a result, the cover 32 flexes as the locking fingers 56, 58 interlock with the locking tabs 52, 54, respectively, and assumes its normal shape after the locking fingers 56, 58 have fully engaged with the locking tabs 52, 54, respectively. In this manner, the cover 32 facilitates the snap-fit engagement between the locking fingers 56, 58 and the locking tabs 52, 54, respectively. Moreover, the trough 64 facilitates the removal of an associated core from the sealing nut 14 after the molding of same and therefore facilitates the molding process.

It should be noted that the present invention can have numerous modifications and variations. For instance, the orientation of the lateral passageway 68 relative to the longitudinal passageway 36 of the body 12 can be modified to assume other angles (e.g., 100°). In addition, the base 30 can have a shape other than a hexagonal shape. Moreover, the living hinge 34 can be replaced with any other conventional hinge mechanism. The locking fingers 56, 58 and the locking tabs 52, 54 can also be replaced with any conventional locking mechanism. Further, the sealing nut 14 can be made from other suitable materials and/or by other conventional processes.

FIGS. 10–15 and FIGS. 16 and 17 depict second and third embodiments, respectively, of the present invention. Elements illustrated in FIGS. 10–15 and FIG. 16 and 17 which correspond, either identically or substantially, to the elements described above with respect to the embodiment of FIGS. 1–9C have been designated by corresponding reference numerals increased by one hundred and two hundred, respectively. Unless otherwise stated, the embodiments of FIGS. 10–17 are constructed, assembled and used in the same basic manner as the embodiment of FIGS. 1–9C.

FIGS. 10–15 illustrate a liquid-tight fitting 110 which is equipped with a 90° sealing nut 114 constructed in accordance with a second embodiment of the present invention. The construction, operation and usage of the sealing nut 114 are identical to those of the sealing nut 14 of the embodiment shown in FIGS. 1–9C, except as follows. The sealing nut 114 has a base 130 provided with a pair of cavities 146, 148 which are formed in an exterior wall 150 of the base 130 on opposing sides thereof. Locking tabs 152, 154 are formed in the cavities 146, 148, respectively, and extend laterally from the base 130 in opposite directions. Like the locking tabs 52, 54 of the embodiment of FIGS. 1–9C, the locking tabs 152, 154 are oriented transversely with respect to the longitudinal axis B of the base 130. The sealing nut 114 also has a cover 132 equipped with a pair of locking fingers 156, 158 depending from the cover 132 on opposite sides thereof. The locking fingers 156, 158 are sized and shaped so as to interlock with the locking tabs 152, 154, respectively, of the base 130 and to thereby couple the cover 132 to the base 130 in a snap-fit fashion (see FIGS. 11, 14 and 15). Each of the cavities, 146, 148 also includes side planar walls 146b, 146c for capturing a corresponding one of the locking fingers 156, 158 therebetween (see FIGS. 10, 12 and 15). In this manner, the locking fingers 156, 158 are inhibited from moving laterally relative to the locking tabs 152, 154, respectively, thereby providing enhanced resistance to accidental disengagement of the cover 132 from the base 130. Moreover, because the locking tabs 152, 154 are oriented transversely relative to the longitudinal axis B of the base 130, the locking tabs 152, 154 and the locking fingers 156, 158 come to engage each other in a vertical direction. In such circumstances, the locking tabs 152, 154 and the locking fingers 156, 158 further enhance resistance to accidental disengagement of the cover 132 from the base 130.

Figure 16:
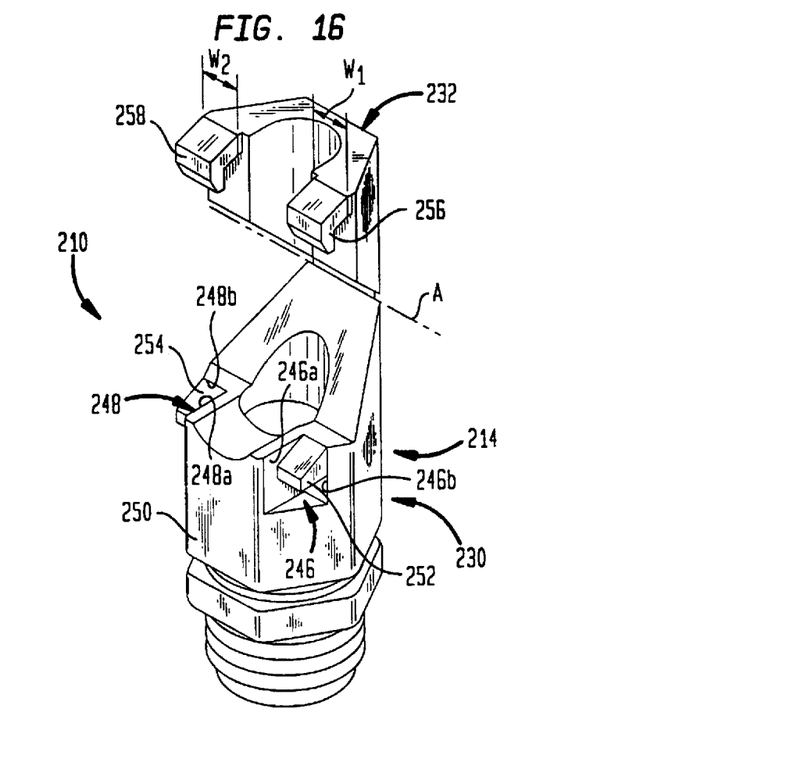
FIG. 16 is a perspective view of a liquid-tight fitting which is equipped with a 90° sealing nut constructed in accordance with a third embodiment of the present invention, the sealing nut being shown in it open position.
Figure 17:
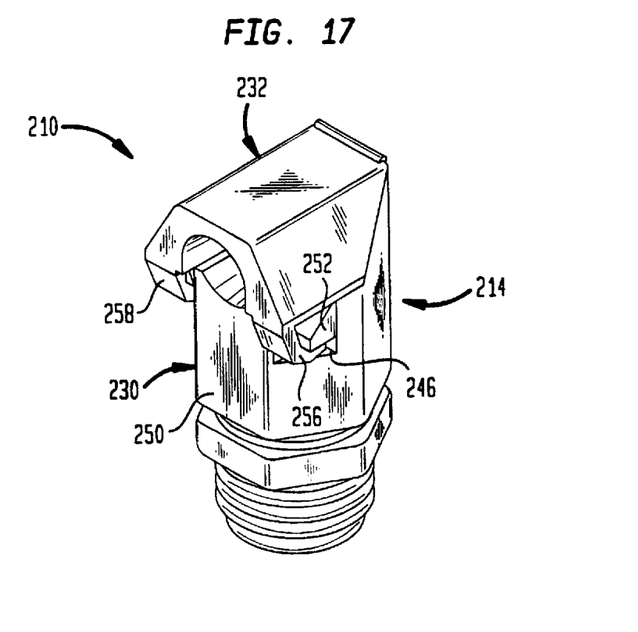
FIG. 17 is a view similar to FIG. 16, except that the sealing nut is in its closed position.

FIGS. 16 and 17 illustrate a liquid-tight fitting 210 which is equipped with a 90° sealing nut 214 constructed in accordance with a third embodiment of the present invention. The construction, operation and usage of the sealing nut 214 are identical to those of the sealing nut 14 of the embodiment shown in FIGS. 1–9C, except as follows. The sealing nut 214 has a base 230 and a cover 232 pivotable about a pivot axis A. More particularly, the base 230 is provided with a pair of cavities 246, 248 which are formed in an exterior wall 250 of the base 230 on opposite sides thereof. The cavities 246, 248 include transverse planar walls 246a, 248a, respectively, which are substantially normal to the pivot axis A, and parallel planar walls 246b, 248b, respectively, which are substantially parallel to the pivot axis A. Locking tabs 252, 254 are formed and located in the cavities 246, 248, respectively, and extend forwardly from the base 230 (i.e., they project from the walls 246b, 248b, respectively, of the cavities 246, 248, respectively). The cover 232 is equipped with a pair of locking fingers 256, 258 depending from the cover 232. The locking fingers 256, 258 are sized and shaped so as to interlock with the locking tabs 252, 254, respectively, of the base 230 and to thereby couple the cover 232 to the base 230 in a snap-fit fashion. The locking fingers 256, 258 have widths $W_1$, $W_2$, respectively, extending in a direction which is substantially parallel to the walls 246b, 248b, respectively, of the cavities 246, 248, respectively, when the locking fingers 256, 258 engage the locking tabs 252, 254, respectively.

Figure 18:
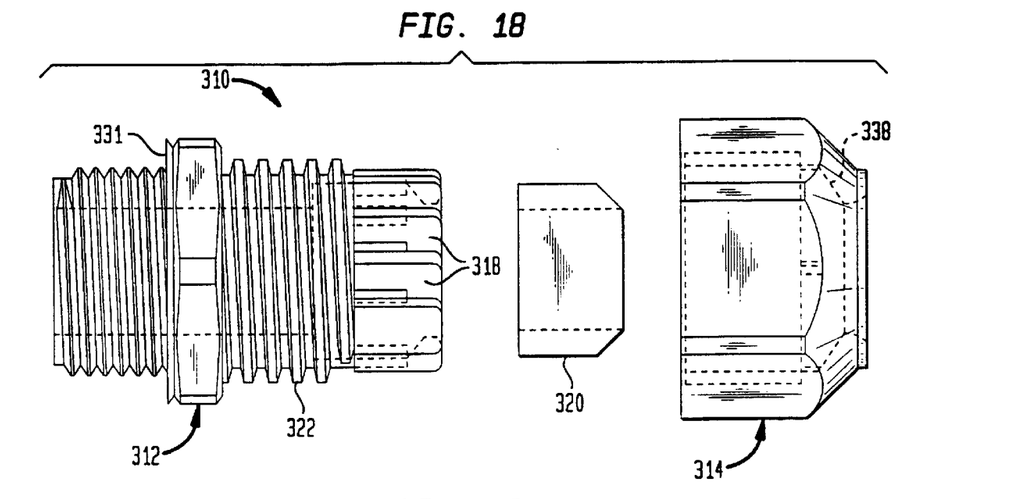
FIG. 18 is an exploded, side view of a liquid-tight fitting in accordance with a fourth embodiment of the present invention.

FIG. 18 shows a fluid-tight fitting 310 in accordance with an alternative embodiment of the present invention. As before, the body 312 has a plurality of flexible fingers 318 arranged in an annular pattern and extending in an axial direction from one end thereof. A gland 320 of deformable sealing material is embraced by the fingers 318 (see FIG. 26) and assists in forming a fluid tight seal against an electrical cable or other elongated object held in the fluid tight fitting 310. A sealing nut 314 is threadedly received on threads 322 of the body 312 and upon tightening, a conically shaped inner surface thereof 338 (shown in phantom) abuts against and urges the fingers 318 inwardly to grasp the inserted object to be held. As can be appreciated, the fitting 310 is similar in overall structure and function to the fitting shown and described in U.S. Pat. No. 5,405,172 to the inventor herein and assigned to the assignee herein, such patent being incorporated by reference herein for its teachings concerning the configuration and manufacture of a fluid-tight fitting. Notwithstanding, the embodiment of the invention depicted in FIGS. 18–29 exhibits a number of novel features which shall be described below. It should further be appreciated that the sealing nut 314 depicted in FIGS. 18–29 could be replaced by a sealing nut for maintaining a 90 degree cable exit angle like the sealing nut 14 shown in FIGS. 1–17 and described above.

FIGS. 18, 21, 26 and 28 illustrate a novel cup-shaped sealing flange 331 that has a hollow cup-shape prior to affixation of the fitting to a mounting plate or housing. The flange 331 flattens out when the fitting is threaded into or drawn against a mounting surface (See FIG. 28), the material of the fitting being sufficiently elastic to allow the flattening of the cup-shaped flange 331. Air or moisture trapped between the cup-shaped flange 331 and the mounting surface is expelled when the flange is flattened. Because the cup-shaped flange 331 is resilient and tends to return to its original cupped shape, the flange 331 can accommodate irregularities (e.g., unevenness or warpage) in the mounting surface, thereby insuring proper sealing. Upon flattening, the flange 331 spreads out providing a large sealing surface. The cup-shaped flange 331 therefore provides an effective seal without the use of washers or other sealing hardware.

Figure 19:
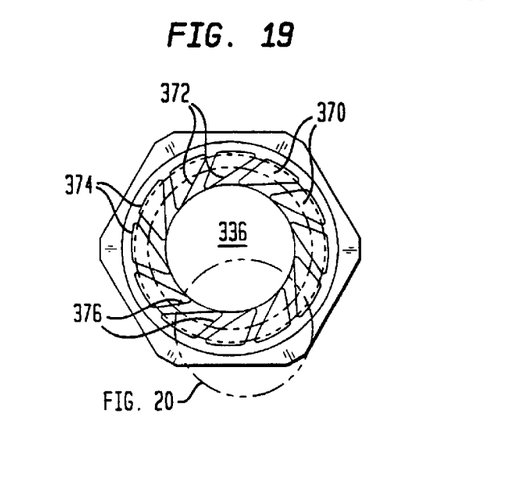
FIG. 19 is a front view of the grasping portion of the liquid-tight fitting of FIG. 18.

FIG. 19 shows the generally triangular or wedge-shaped upper ends 370 at the end of each finger 318. The upper triangular ends 370 of the fingers 318 are spaced apart and extend radially inward with an inner side 372 of the triangle being approximately tangent to the outer circumference of the cable channel 336 through the body 312. An outer side 374 of the triangle is preferably curved to approximate the curvature of the conical inner surface 338 of the sealing nut 314 thereby facilitating rotation of the nut 314 relative to the fingers 318. An intermediate side 376 completes each triangle and frictionally interacts with the inner side 372 of an adjacent upper end 370 when the fitting 310 is tightened, as more fully described below.

Figure 20:
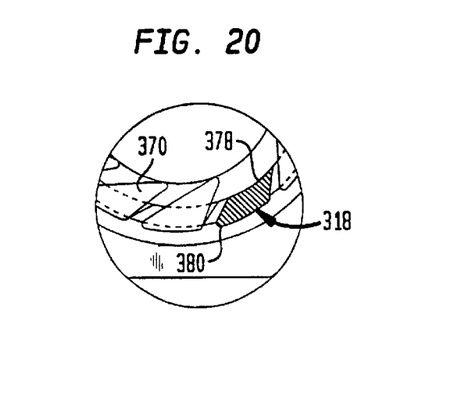
FIG. 20 is an enlarged, partially cross-sectional view of the grasping fingers of the liquid-tight fitting of FIG. 19.

FIG. 20 shows a finger 318 in cross-section at a position below the triangular upper end 370. The fingers 318 can be seen to have a thin cross-section relative to the triangular upper ends 370 and have a generally flattened parallelogram shape, with the parallelogram having a pair of acute, opposing, included angles giving rise to lateral extensions 378, 380 which overlap the extensions 378, 380 of adjacent fingers 318. This overlapping provides peripheral support for the gland while allowing the fingers to remain flexible and to converge when the sealing nut 314 is tightened.

Figure 21:
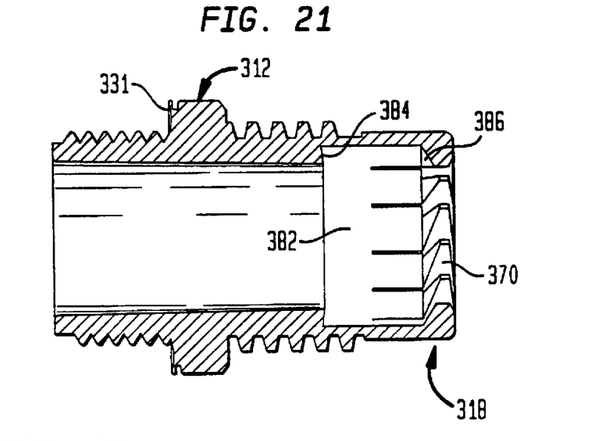
FIG. 21 is a cross-sectional view of the grasping conduit portion of the liquid-tight fitting of FIG. 18.
Figure 26:
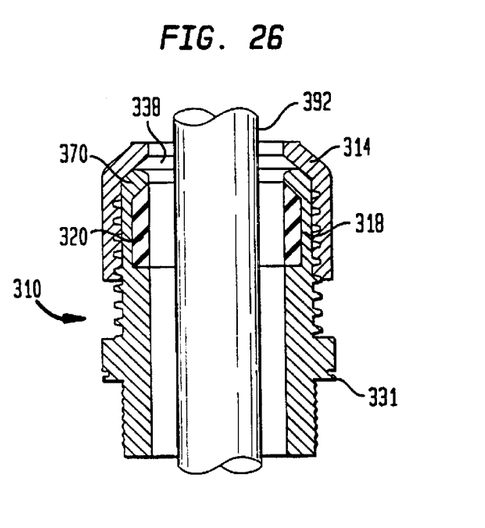
FIG. 26 is a partially cross-sectional view of the fitting of FIG. 25 taken along section lines XXVI—XXVI and looking in the direction of the arrows.

FIG. 21 illustrates the recess 382 provided in the body 312 of the fitting 310 to accommodate the gland 320. The recess 382 is defined at one end by an inner, tapered, annular seat 384 formed proximate the base or origin of the fingers 318. The taper slopes deeper into the body 312 as the seat 384 extends radially outward. From the outer peripheral edge of the tapered seat 384, the recess extends in an axial direction toward the triangular-shaped finger ends 370. As can be appreciated from FIG. 21, the underside of the ends 370 are each beveled so as to form in unison an upper, tapered seat 386 having the same general orientation as the inner seat 384 but with a greater angle of taper. Referring to FIG. 26, one can appreciate that the gland 320 has a shape that is complementary to that of the recess 382 in which the gland is snugly embraced, even when the fitting is in the untightened condition.

Figure 22:
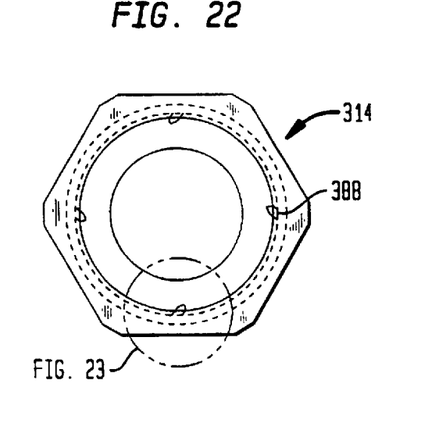
FIG. 22 is a front view of the sealing nut of the fitting of FIG. 18.
Figure 23:
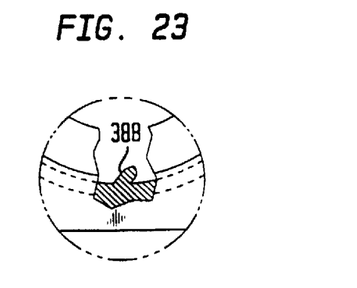
FIG. 23 is detailed, partially cross-sectional view of the sealing nut of FIG. 22.
Figure 24:
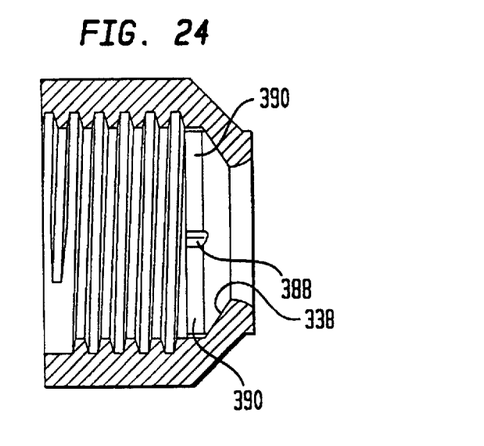
FIG. 24 is a cross-sectional view of the sealing nut of FIG. 22, taken along line XXIV—XXIV and looking in the direction of the arrows.
Figure 25:
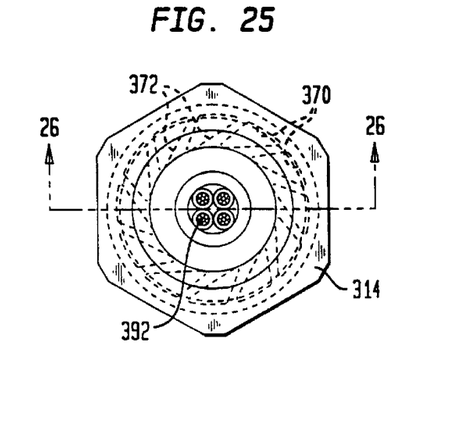
FIG. 25 is a front, partially diagrammatic view of the fluid-tight fitting of FIG. 18 in an untightened condition and with an electrical cable positioned in the cable passageway thereof.

FIGS. 22–24 show a sealing nut 314 in accordance with an embodiment of the present invention and including novel ratchet locks 388 projecting from an inner wall surface and extending radially inwards towards the center of the nut. The enlarged view of the ratchet lock 388 of FIG. 23 reveals that the lock has a directional sense like a pawl and, as illustrated, points counter-clockwise. The counterclockwise orientation shown would be appropriate for a fitting 310 on which the sealing nut 314 tightens in a clockwise direction, i.e., right-handed threads. A reverse orientation of the locks 388 could be utilized for left-handed threads that tighten in a counterclockwise direction. In operation, the locks 388 ramp over the edges of the fingers 318 as the sealing nut 314 is tightened. This is possible due to the flexibility of the locks 388 and the fingers 318 which elastically deform as the locks 388 pass over the fingers 318. To prevent inadvertent loosening of the fitting, the locks 388 hook onto and/or abut against the edges of the fingers 318 rather than ramp over them when turned in the direction in which they point.

FIG. 24 shows that the locks 388 are placed on the sealing nut 314 in a novel position. More specifically, the locks 388 extend from an inner peripheral surface 390 of the sealing nut between the threads and the conical inner surface 338. The benefit realized by this positioning of the locks 388 is to avoid the undue mechanical distortion associated with placing the locks 388 directly on the conical inner surface 338, as would be suggested by the normal practice in the industry. If the locks 388 are disposed on the inner surface 338, they are exposed to the frictional and displacement forces required to bend and position the fingers 318 as the fitting 310 is tightened. The forces experienced in the area of the conical surface 338 tend to be large enough to distort the locks 388 beyond their elastic limit rendering them ineffective. Accordingly, positioning the locks 388 in an area that avoids the mechanical interface between the sealing nut 314 and the fingers 318 while still acting upon the fingers at a lower point along their length preserves the shape and functionality of the locks 388 even after tightening. The locks 388 of the present invention can be utilized in combination with known locking apparatus, such as reliefs or dimples positioned on the conical surface 338 of the sealing nut 314.

Figure 27:
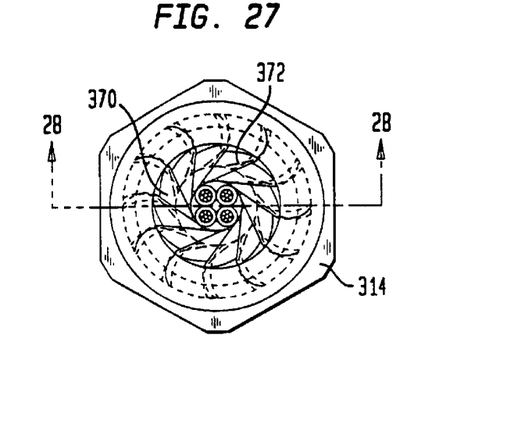
FIG. 27 is a front, partially diagrammatic view of the fluid-tight fitting of FIG. 25 in a tightened condition.
Figure 28:
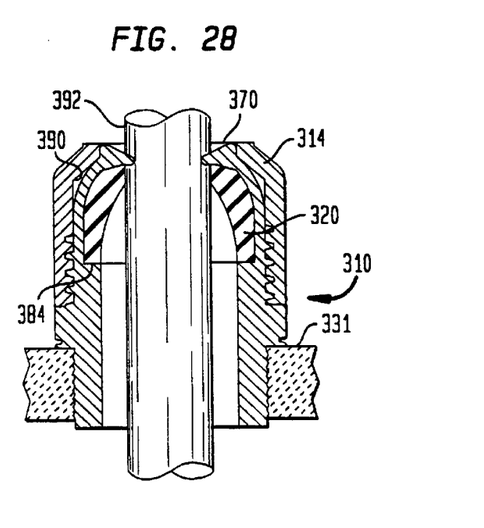
FIG. 28 is a partially cross-sectional view of the fitting of FIG. 27 taken along section lines XXVII—XXVII and looking in the direction of the arrows.
Figure 29:
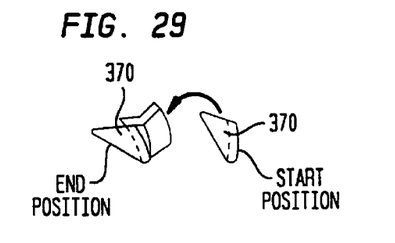
FIG. 29 is a diagrammatic view of one of the grasping fingers of the fluid tight fitting of FIGS. 25–28 undergoing movement from a first position in the untightened state to a second position in the untightened state.

FIGS. 25, 26 and 27, 28 are front and cross-sectional views of the fitting in an untightened and a tightened condition, respectively. FIG. 29 shows the movements of the triangular ends 370 during the transition from an untightened condition to a tightened condition. As can be appreciated by comparing FIGS. 25 and 27, the triangular ends 370 of the fingers 318 start with the inner sides 372 thereof approximately tangent to the inner peripheral lumen of the gland 320 and the outer curved sides 374 of the triangular ends 370 are generally in line with the circle defining the intersection between the conical inner surface 338 and the surface 390. The triangular ends 370 are spaced one from another. When the sealing nut 314 is tightened, as shown in FIG. 27, the inner sides 372 end up in approximate tangency to a much smaller circle. This is consistent with the movement of the triangular ends 370 as illustrated in FIG. 29, viz., that the triangular ends 370 rotate inwardly towards the center of the fitting 310 as the sealing nut 314 is tightened. The inward rotation of the triangular ends 370 causes the ends to extend a greater distance toward the central axis of the fitting 310 such that they extend over the gland 320 and bite directly into the cable 392 to be held within the fitting 310. Typically the fitting 310 is composed of a tough and dense plastic. In contrast, the gland 320 is typically formed from a more compliant material such as rubber. The present invention thus utilizes the relatively sharp "points" on the triangular ends of the more rigid fingers 318 to grasp the cable 392 rather than causing the fingers to press the softer, smoother, deformable gland 320 into contact with the cable. As a result, the rigid, thick, triangular ends 370 of the fingers 318 "bite" into the relatively soft outer insulation of the cable 392 leading to an effective grip on the cable. One might also note that the triangular ends 370 are thick relative to the remainder of the fingers 318. This distribution of material permits the fingers 318 to bend as shown in FIG. 28 while strengthening the ends 370 which are forced by the sealing nut 314 into close contact with the cable 392. FIG. 29 illustrates that the fingers 318 bend inwardly as the sealing nut 314 is tightened. This inward bending is also depicted in FIG. 28, which further shows the simultaneous downward bending of the triangular ends 370. The consequence of this simultaneous bending is to push the gland 320 down and against the tapered lower seat 384 as well as pressing it against the cable. When the gland 320 is urged as depicted in FIG. 28, it effects a seal against the cable 392 and against the seat 384. In this manner, the gland 320 is both retained securely within the fitting 310 and is urged in the proper directions to provide the necessary dual sealing function required.

It may also be appreciated by examining FIG. 27 that the triangular ends 370 are elongated due to the fact that the triangles have two severely acute angles and a correspondingly open third angle. As a result, the length of the inner 372 and intermediate 376 sides is large. As shown in FIG. 27, the triangular ends 370 are urged together such that the inner 372 and intermediate 376 sides of adjacent triangular ends 370 are in contact. Since the area of contact is large, the triangular ends 370 bear against one another over a large area and tend to lock together due to friction. Because the triangular ends 370 are rigidly and their motion firmly limited by contact with adjacent ends 370 and by the sealing nut 314, it is very difficult to expand the central aperture of a tightened fitting 310, e.g., by forces exerted on the cable 392. The relatively large size of the triangular ends 370 assures that the points thereof will extend a significant distance beyond the gland 320 and can be induced to bite deeply into the cable 392. Because the radial length of the triangular ends 370 defines, in part, the potential radial displacement determining the effective size of the cable channel through the fitting 310, the larger the triangular ends 370, the greater the range of sizes of cables that can be accommodated by the fitting.

It will be understood that the embodiments described herein are merely exemplary and that a person skilled in the art may make many variations and modifications without departing from the spirit and scope of the invention. All such variations and modifications are intended to be included within the scope of the invention as defined by the appended claims.

What is claimed is:

1. A connector for sealingly retaining an elongated object passing therethrough, characterized by a generally cylindrical conduit body having a central bore and threaded at first and second ends thereof, said first end of said body having a plurality of fingers extending in an axial direction therefrom, each of said fingers spaced from adjacent said fingers and terminating at a free end thereof in a wedge-shaped gripper extending normal to the axial direction; a flexible, generally cylindrical gland disposed within the central bore of said body within a mating recess formed therein, said recess including a lower annular seat formed about the periphery of said central bore proximate the origin of said fingers, said lower annular seat tapering toward said second end as said seat extends radially outward, said recess further defined by an upper annular seat formed on an inside surface of each of said wedge-shaped grippers, said upper annular seat tapering toward said second end as said upper annular seat extends radially outward; and a sealing nut threadedly receivable upon said first end of said body, said sealing nut having an aperture through which said elongated object extends, an inner conical surface of said sealing nut leading from threads provided therein to said aperture in said sealing nut, said conical surface contacting said fingers proximate said wedge-shaped grippers and urging said wedge-shaped grippers radially inwards and downwards toward said second end as said sealing nut is tightened onto said first end, said gland being pressed inwards against said elongated object by said wedge-shaped grippers and downward against said lower annual seat as said sealing nut is tightened.

2. The connector of claim 1, characterized in that said elongated object is an electrical cable and further characterized by means for bending and holding a bend in said cable at a predetermined angle relative to the axis of said body.

3. The connector of claim 2, characterized in that said predetermined angle is approximately 90 degrees.

4. The connector of claim 1, further characterized by means for locking said sealing nut at a selected orientation after said sealing nut has been threaded onto said first end, said means for locking extending from an interior surface of said sealing nut intermediate said threads of said sealing nut and said inner conical surface, said means for locking interacting with said fingers to prevent turning of said sealing nut in a loosening direction.

5. The connector of claim 4, characterized in that said locking means includes pawls extending from said interior surface of said sealing nut pointing radially inwardly and in the loosening direction, said pawls ramping over said fingers when said sealing nut is tightened and engaging said fingers when said sealing nut is turned in the loosening direction, said pawls engaging said fingers along the axial extension of said fingers.

6. The connector of claim 1, further characterized by an exterior, peripheral cup-shaped seal positioned proximate said second end of said body, said seal being engageable against a surface of a mounting for said connector to prevent fluids from penetrating between said mounting and said connector.

7. The connector of claim 6, characterized in that said seal is flexible and bends from an unloaded, cup-shape to a flattened flange shape conforming to the surface of said mounting when said second end of said connector is installed into said mounting.

8. The connector of claim 7, characterized in that said seal retains elastic memory after being displaced to a flattened configuration.

9. The connector of claim 8, characterized in that said elastic memory permits conformance to irregularities in said mounting.

10. The connector of claim 8, characterized in that said elastic memory renders said cup-shaped seal reusable.

11. A sealing nut for a connector for sealingly retaining an elongated object passing therethrough, said connector having a generally cylindrical conduit body with a central bore and threaded at first and second ends thereof, said first end of said body having a plurality of fingers extending in an axial direction therefrom, each of said fingers spaced from adjacent said fingers, said sealing nut characterized by a nut-like threaded portion; an unthreaded portion extending from one end of and contiguous with said threaded portion, said threaded portion threadedly receivable upon said first end of said body, said unthreaded portion having an aperture at one end distal to said threaded portion through which said elongated object is extendible and an inner conical surface disposed about said aperture for contacting said fingers and urging said fingers radially inwardly as said sealing nut is tightened onto said first end; and means for locking said sealing nut at a selected orientation after said sealing nut has been threaded onto said first end, said means for locking extending from an interior surface of said sealing nut intermediate said threaded portion of said sealing nut and said inner conical surface, said means for locking interacting with said fingers to prevent turning of said sealing nut in a loosening direction.

12. The sealing nut of claim 11, characterized in that said locking means includes pawls extending from said interior surface of said sealing nut pointing radially inwardly and in the loosening direction, said pawls ramping over said fingers when said sealing nut is tightened and engaging said fingers when said sealing nut is turned in the loosening direction, said pawls engaging said fingers along the axial extension of said fingers.

13. A connector for sealingly retaining an elongated object passing therethrough and having a generally cylindrical conduit body with a central bore and threaded at first and second ends, said first end adapted to clamp said elongated object within said connector and said second end adapted to retain said connector in rigid juxtaposition relative to a mounting surface, said connector characterized by an exterior, peripheral sealing flange formed monolithically with said body proximate said second end, said flange extending radially outward from said connector and simultaneously curving towards said second end, said flange having dimensions permitting it to elastically flex when said connector is installed on said mounting surface to assume a flattened configuration with a greater radial extent than when said flange is in a curved configuration.

14. The connector of claim 13, characterized in that said sealing flange conforms to the surface of said mounting when said second end of said connector is installed into said mounting.

15. The connector of claim 13, characterized in that said sealing flange retains elastic memory after being displaced to said flattened configuration such that said sealing flange is reusable.

16. The connector of claim 15, characterized in that said elastic memory permits conformance to irregularities in said mounting.

* * * * *